United States Patent [19]

Ethington et al.

[11] Patent Number: 4,834,853
[45] Date of Patent: May 30, 1989

[54] FAST PYROLYSIS REACTOR AND METHOD OF ENHANCING UNSATURATED HYDROCARBON FORMATION

[75] Inventors: Don Ethington, Dimmitt; Ray J. Riley, Hart; Richard W. Tock, Lubbock, all of Tex.

[73] Assignee: Al-Chem Fuels, Inc., Dimmitt, Tex.

[21] Appl. No.: 77,740

[22] Filed: Jul. 27, 1987

Related U.S. Application Data

[63] Continuation-in-part of Ser. No. 729,567, May 2, 1985, Pat. No. 4,690,743.

[51] Int. Cl.$^4$ ................................................. C07C 3/24
[52] U.S. Cl. ..................................... 204/168; 204/170; 48/65
[58] Field of Search ..................... 204/168, 170; 48/65

[56] References Cited

U.S. PATENT DOCUMENTS

| | | | |
|---|---|---|---|
| 3,400,020 | 9/1968 | Naff | 204/170 |
| 3,959,104 | 5/1976 | Fazes | 204/168 X |
| 4,664,767 | 5/1987 | Kudo et al. | 204/168 X |
| 4,690,743 | 9/1987 | Ethington et al. | 204/168 |

Primary Examiner—Stephen J. Kalafut
Attorney, Agent, or Firm—Shlesinger & Myers

[57] ABSTRACT

A fast pyrolysis reactor includes a tank having a top, bottom and sidewalls extending therebetween and defining a reaction chamber. A fluid inlet and a gas outlet communicate with the chamber. A plurality of cooperatively paired first and second electrodes are positioned within the chamber. Each electrode of a pair is laterally spaced from and vertically aligned with its associated electrode. A gas collection bell is positioned within the chamber and communicates with the gas outlet for collecting generated gas. A power transformer has the poles thereof operatively connected with the electrodes. A tray is positioned between and below the electrodes for defining an interface region extending between the electrodes so that a plasma field is generated between the electrodes when the interface region is formed from two generally immiscible fluids, one of which is conductive and the other of which is insulative, so that the fluids are electrically and thermally decomposed by the plams field into a gas mixture.

25 Claims, 4 Drawing Sheets

FAST PYROLYSIS REACTOR AND METHOD OF ENHANCING UNSATURATED HYDROCARBON FORMATION

RELATED APPLICATIONS

This is a continuation-in-part of our pending application, Ser. No. 729,567, filed May 2, 1985 for the invention entitled Apparatus and Method for Gas Synthesis, now U.S. Pat. No. 4,690,743, the disclosure of which is incorporated herein by reference.

BACKGROUND OF THE INVENTION

Agrichemicals must influence some aspect of the ecosystem to which they are applied if they are to be effective. Whenever the biological activity generated by their presence is judged to cause more harm than benefit, then the agrichemical becomes hazardous, as opposed to beneficial. Immediate harmful effects are usually associated with accidental spills, misapplication rates, or improper disposal of the concentrated waste chemical. Protracted effects can occur when the dispersed chemicals are reconcentrated by biological food chains.

Much research has been devoted to methods for disposing of agrichemicals, as well as other similarly hazardous chemicals and industrial wastes. One particular approach has involved the inceneration of such wastes, although this itself can create an air pollution control problem. Similarly, the materials may be disposed of in appropriately constructed waste basins, although such disposal procedures are expensive and result in a complete economic loss of the chemical. No procedure has been developed, as yet, to convert the waste chemicals into a form suitable for further processing and ultimately reuse.

Our above-referenced patent application discloses a method and apparatus for converting certain types of carbonaceous liquid and particulate material into a medium grade BTU gas through plasma techniques. We have now found that dissolved agrichemicals, chlorinated hydrocarbons and other similar liquid organic wastes can also be thermally decomposed and chemically reformed by that process. The resulting chemically reformed gas has a significant fraction of unsaturated hydrocarbons, has a hydrogen-carbon monoxide ratio in excess of 3:1 and includes hydrogen and carbon monoxide which are useful in the synthesis of oxo chemicals, such as aldehydes, ketones and the like. The process is non-specific, thereby resulting in the destruction of the conductive layer, as well as the insulative layer, and cannot be used to recover the chemicals.

OBJECTS AND SUMMARY OF THE INVENTION

The primary object of the disclosed invention is a process and apparatus for the fast thermal pyrolysis of waste materials into a synthesis gas having a significant fraction of unsaturated hydrocarbons, a hydrogen-carbon monoxide ratio of at least 3:1 and which is suitable for processing into oxo chemicals, among others.

A fast pyrolysis reactor includes first means defining a bounded volume and including a fluid inlet and a gas outlet. First and second laterally spaced and vertically aligned electrodes are positioned within the volume. Second means are likewise positioned within the volume and define an interfacial region extending between the electrodes, the interface being formed by two generally immiscible fluids which substantially fill the volume. A power supply has at least two terminals, one of the terminals being operatively connected with the first electrode and the other of the terminals being operatively connected with the second electrode so that a plasma field is generated beneath the electrodes when the interfacial region is established therebetween. The fluids are dissociated by thermal and beta radiation and then chemically reformed into the gas mixture by the electrical plasma discharge.

A process for enhancing the production of unsaturated hydrocarbons includes juxtaposition of two generally immiscible fluidic materials so that the materials form discrete layers and an interfacial region therebetween. One of the materials is an electrically insulative organic material and the other material is conductive and at least one of the materials includes a catalyzing agent. An elecrical discharge plasma field is established within the interfacial region and the plasma field thermally decomposes the two materials. The resulting gas, which is thus chemically reformed is stabilized through the inherent quenching process achieved due to the relatively small size of the plasma field as compared to the large volume of the fluids. The gas mixture includes a substantial portion of unsaturated hydrocarbons. The gas mixture is then collected and is further processed, utilized or consumed by combustion.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein.

DESCRIPTION OF THE INVENTION

Figure 1:
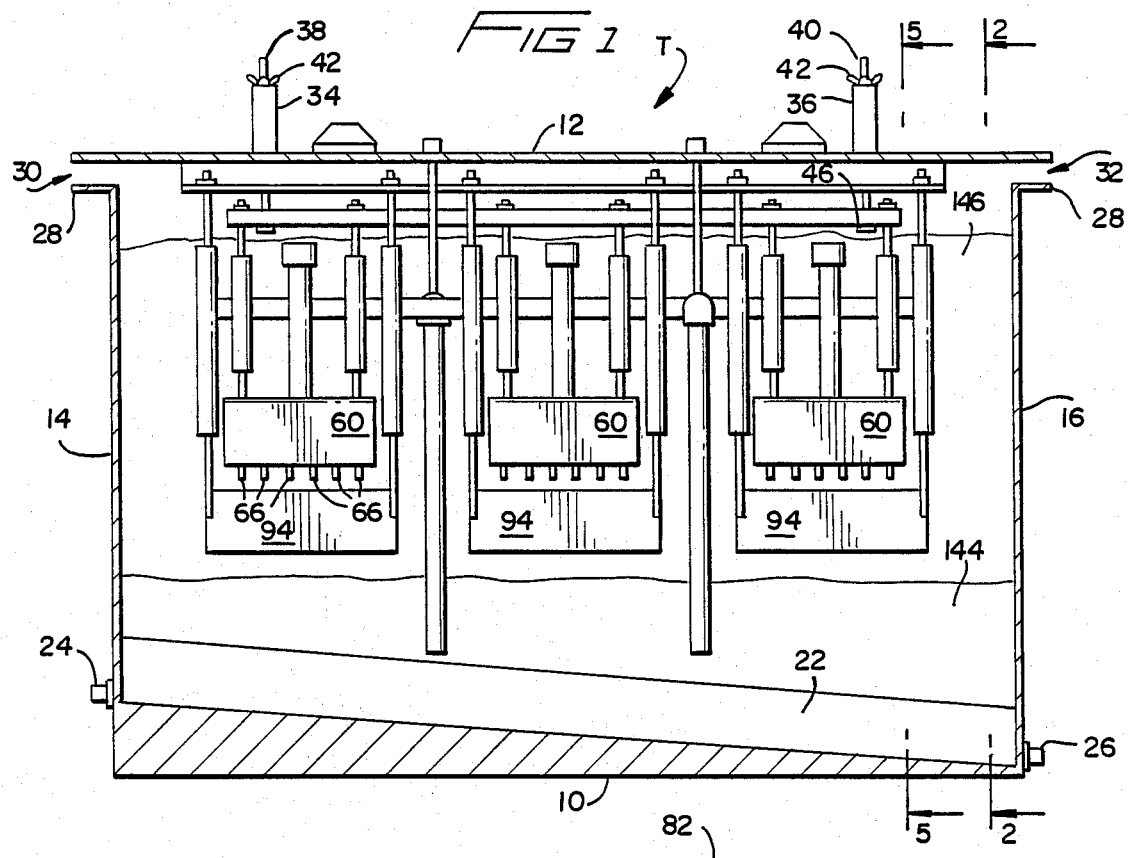
FIG. 1 is a longitudinal cross-sectional view of the pyrolysis reactor of the invention.
Figure 2:
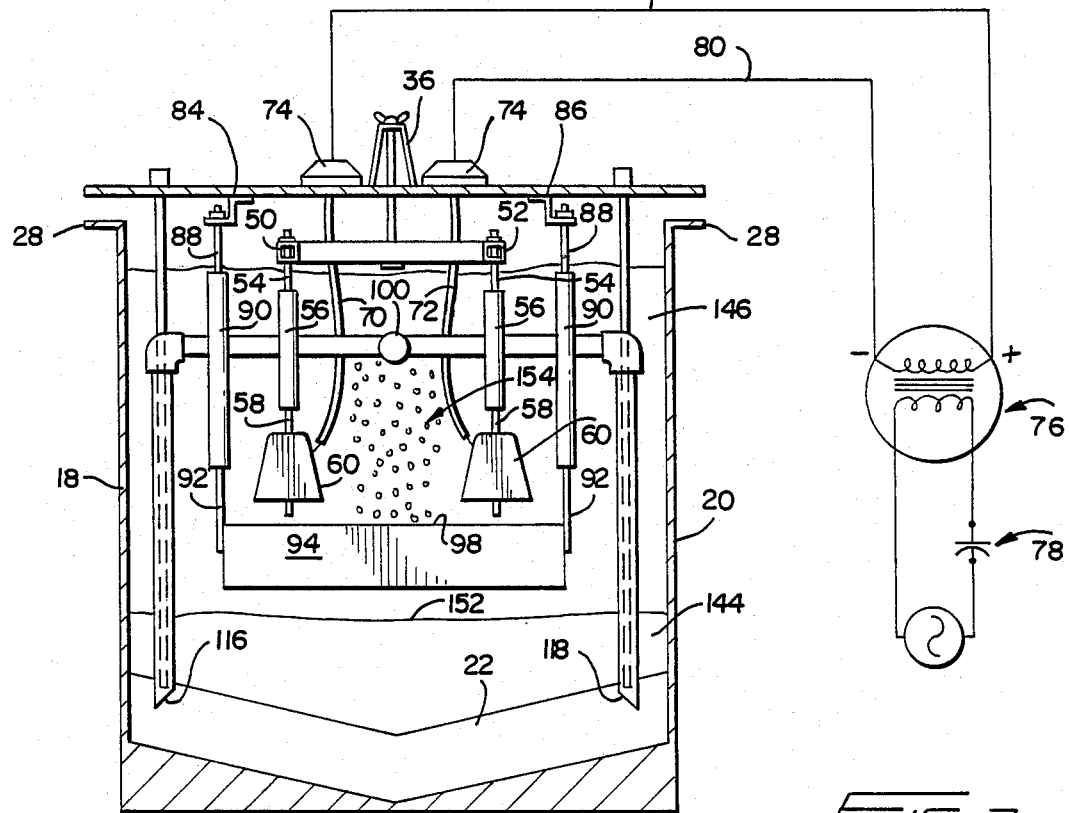
FIG. 2 is a cross-sectional view taken along the line 2—2 of FIG. 1 and viewed in the direction of the arrows, and with portions shown in schematic.

FIGS. 1 and 2 disclose tank T having a bottom 10, a top 12 and sidewalls 14, 16, 18 and 20 extending therebetween. Bottom 10 preferably has a V-shaped inclined surface 22 extending from sidewall 14 to sidewall 16. Also disclosed in FIG. 1 are pump connections 24 and 26, for reasons to be explained further. The top 12 may be spaced from flange 28 extending from the sidewalls. The reaction process is such that the tank T may be maintained at ambient pressure, although it is preferred that the tank T be sealed in order to increase the resonance time of the resulting gas mixture, as well as to permit the resulting gas to be collected. For this reason, the tank T has a fluid inlet 30 and a gas outlet 32. Naturally, the fluid inlet 30 is operatively connected with a fluid pumping assembly, which need not be further explained. Also, the gas outlet 32 is likewise operatively connected with some gas collection mechanism, which likewise need not be further explained. Should further explanation of the fluid inlet 30 and the gas outlet 32 be necessary, then please see our above referenced patent application.

Supports 34 and 36 are generally U-shaped and are secured to top 12 by welding or the like. The supports 34 and 36 are centrally disposed relative to sidewalls 18 and 20 and are longitudinally spaced apart along top 12. Bolts 38 and 40 extend from supports 34 and 36, respectively, and into the bounded volume V defined by tank T. Wing nuts 42 secure the bolts 38 and 40 to the respective supports and thereby appropriately position the bolt heads 44 and 46. Adjustment of the nuts 42 permits the vertical positioning of the bolt heads 44 and 46 to be regulated, for reasons to be herein explained.

Figure 5:
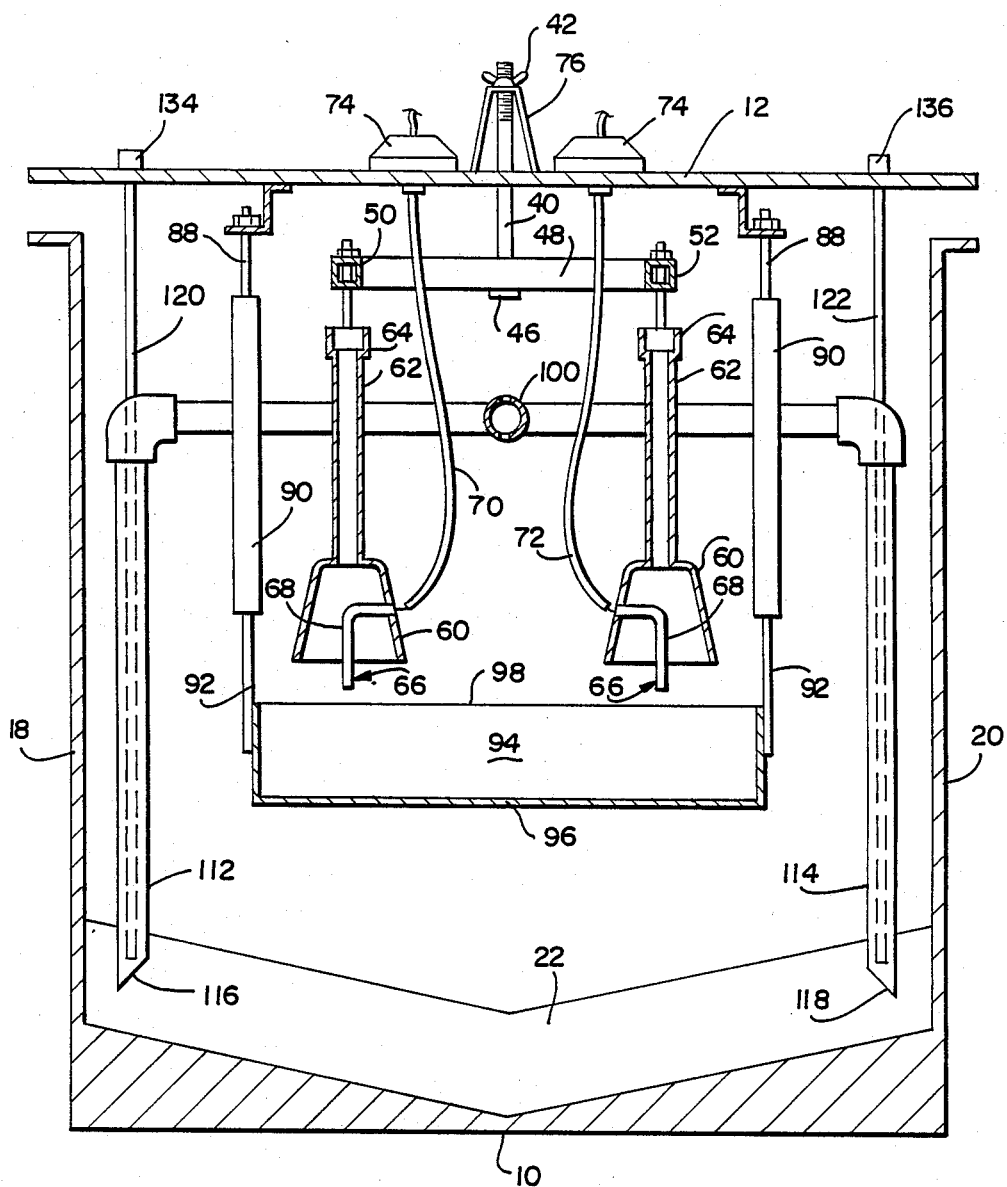
FIG. 5 is a cross-sectional view taken along the section 5—5 of FIG. 1 and viewed in the direction of the arrows.

Cross brace 48 depends from bolt 40, as best shown in FIG. 5. A corresponding cross brace is likewise dependently supported from the bolt 38. Longitudinal members 50 and 52 are secured to the braces 48 and extend generally parallel to side walls 18 and 20, as best shown in FIGS. 2 and 5. The cross braces 48 and members 50 and 52 define a frame which is carried by the bolts 38 and 40. Because the bolts are removable secured to the supports 34 and 36, then the frame may be removed as required for cleaning or other similar service of the tank T. Likewise, the elevation of the frame can be adjusted through appropriate regulation of the wing nuts 42.

Figure 4:
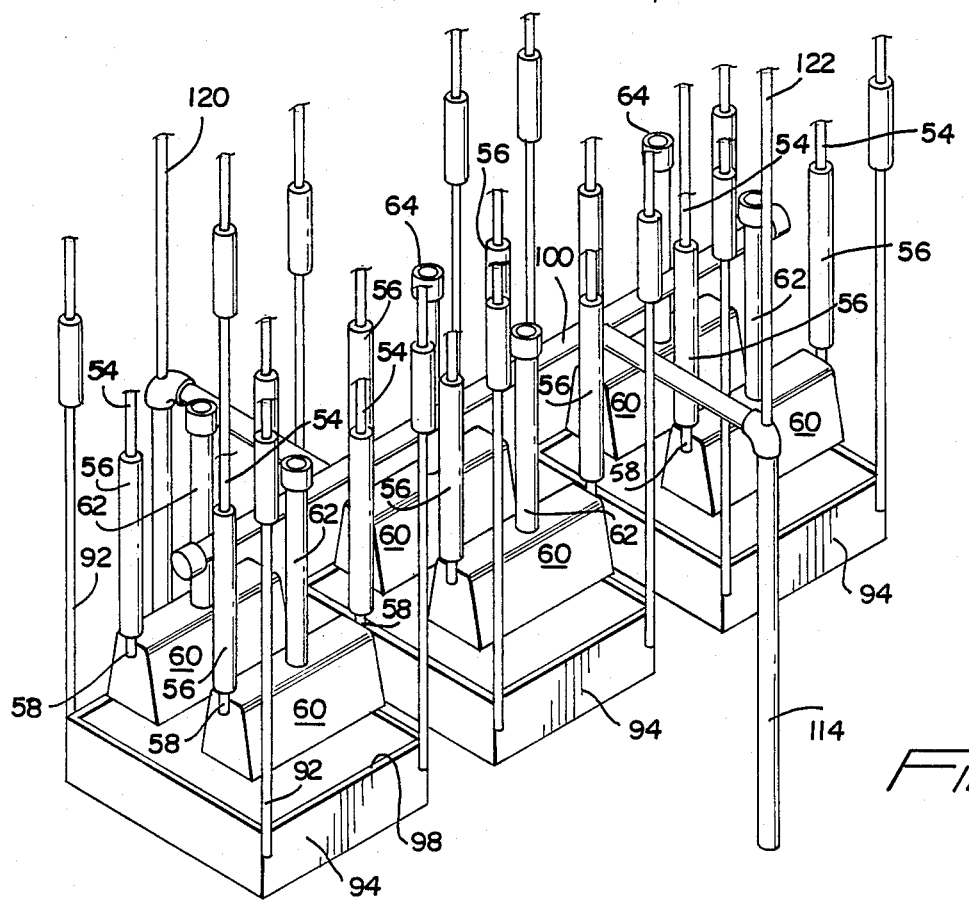
FIG. 4 is a perspective view of the plasma generation and gas collection mechanism of the invention.

Rods 54 extend downwardly from the members 50 and 52 and are operably connected with electrical insulators 56, as best shown in FIG. 2. Rods 58 extend from the lower end of insulators 56 and are secured to bell housings 60. Preferably, there are a plurality of bell housings 60, such as the three such housings extending along each side of tank T, as illustrated in FIGS. 1 and 4. The housings 60 extend parallel to side walls 18 and 20, as best shown in FIGS. 2 and 5. Each bell housing 60 has a gas transport tube 62 extending upwardly therefrom. The gas transport tubes 62 isolate the gas which has been collected by the bell housings 60 and control the transmission of the collected gas to gas outlet 32. FIG. 4 discloses an embodiment of the invention wherein the rods 58 are secured to the remote ends of the bell housings 60, as opposed to being secured intermediate the ends, as best shown in FIG. 1. Each of the gas transport tubes 62 has a surrounding terminal collar 64 which may advantageously secure a valve, such as a check valve, in order to regulate the resonance time of the collected gas.

Electrodes 66 depend from each bell housing 60, as best shown in FIG. 5. Preferably, each electrode 66 has a vertically disposed portion 68 which is in parallel alignment with the respective gas transport tube 62. Preferably, a plurality of electrodes 66 depend from each bell housing 60, such as the six electrodes 66 for each bell housing 60 illustrated in FIG. 1.

Cables 70 and 72 extend from insulators 74, as best shown in FIGS. 2 and 5. The electrodes 66 are disposed in a plurality of electrode pairs, with one electrode of each pair being operatively connected with one terminal of power supply 76, such as through cable 70. The other electrode of each electrode pair is connected with the opposite terminal of power supply 76, such as through cable 72. Preferably, a capacitor 78 is disposed across the primary windings of the power supply 76 so that the power factor of the power supply 76 achieves unity, as explained in our prior cited patent application. Although FIGS. 2 and 5 illustrate a single cable set 70 and 72, those skilled in the art will understand that each electrode 66 may be individually connected with the appropriate pole through its own respective cable. Those skilled in the art will understand that the cables 70 and 72, which are operatively connected to the power supply 76 through leads 80 and 82, respectively, result in a sufficient voltage being generated between the electrodes of an electrode pair to cause a plasma field to be generated therebetween, as will be further explained. Furthermore, it will be understood that the power supply 76 includes both single and multiple phase systems.

Brackets 84 and 86 extend from top 12 in general parallel alignment and run along top 12, as best shown in FIG. 2. Rods 88 extend from the brackets 84 and 86 and carry electrical insulators 90, which correspond with the insulators 56 suspended from the frame. Similarly, rods 92 extend from the insulators 90 and are secured to trays 94, such as by welding and the like. Each of the trays 94 extends between the electrode pairs carried by adjacent bell housing 60, as best shown in FIG. 4.

Each of the trays 94 has a closed bottom 96 and sidewalls extending upwardly therefrom and terminating in an open top edge 98, as best shown in FIGS. 1–2 and 4–5. The trays 94 are, preferably, rectangular in plan, as best shown in FIG. 4, and have a length and width exceeding the associated dimension of a cooperating pair of bell housings 60. The trays 94 assure that there is an interface between the cooperating paired electrodes 66, in order to permit the plasma field to be generated.

Figure 6:
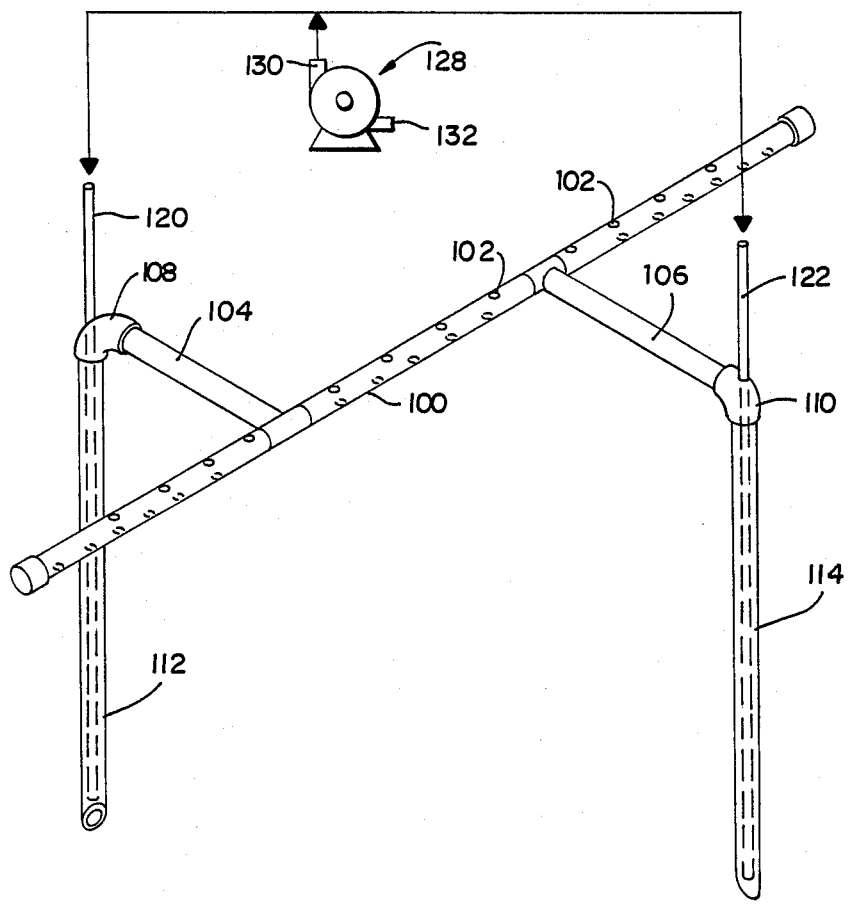
FIG. 6 is a perspective view illustrating the gas lift water pump system of the invention; and, FIG. 7 is a perspective view illustrating the gas lift jet of FIG. 6.
Figure 7:
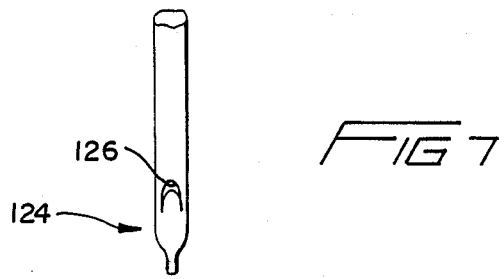

FIGS. 5–7 disclose the gas lift system of the invention. Perforated tube 100 extends longitudinally between sidewalls 18 and 20 and above the trays 94, as best shown in FIG. 5. Tube 100 has a series of circumferentially and longitudinally spaced perforations 102 which permit gas and fluids to exit therethrough. Legs 104 and 106 extend laterally from tube 100. Elbows 108 and 110 are disposed at the terminal ends of legs 104 and 106, respectively. Vertical tubes 112 and 114 extend from elbows 108 and 110, respectively. The tubes 112 and 114 have tapered inlet openings 116 and 120, as best shown in FIG. 5. The inlets 116 and 118 are disposed below the bottoms 96 of the trays 94, and somewhat above surface 22 of bottom 10.

Gas supply tubes 120 and 122 extend through elbows 108 and 110, respectively, and are coaxially disposed within tubes 112 and 114. Each of the gas tubes 120 and 122 terminates in a gas jet 124, as best shown in FIG. 7. Each jet 124 has a gas outlet 126 which is upwardly directed for causing the issuing gas to be directed upwardly within the surrounding tube 112 or 114. Naturally, the gas has a density less than that of the fluid media within the surrounding tube, so that the gas rises upwardly and eventually issues through one of the perforations 102.

Gas compressor 128 has an outlet 130 which is in flow communication with the gas tubes 120 and 122 through appropriate lines. Compressor 128 has an inlet 132 which is in flow communication with gas outlet 32. In this way, the generated gas is collected, is pressurized by the compressor 128 and then is pumped through the gas tubes 120 and 122, so as to eventually be transported upwardly through the tubes 112 and 114, and finally out through the perforations 102. Preferably couplings 134 and 136, as best shown in FIG. 5, connect the gas tubes 120 and 122, respectively, to the gas supply line, and also maintain the tubes 112 and 114 at the proper elevation relative to bottom surface 22.

Figure 3:
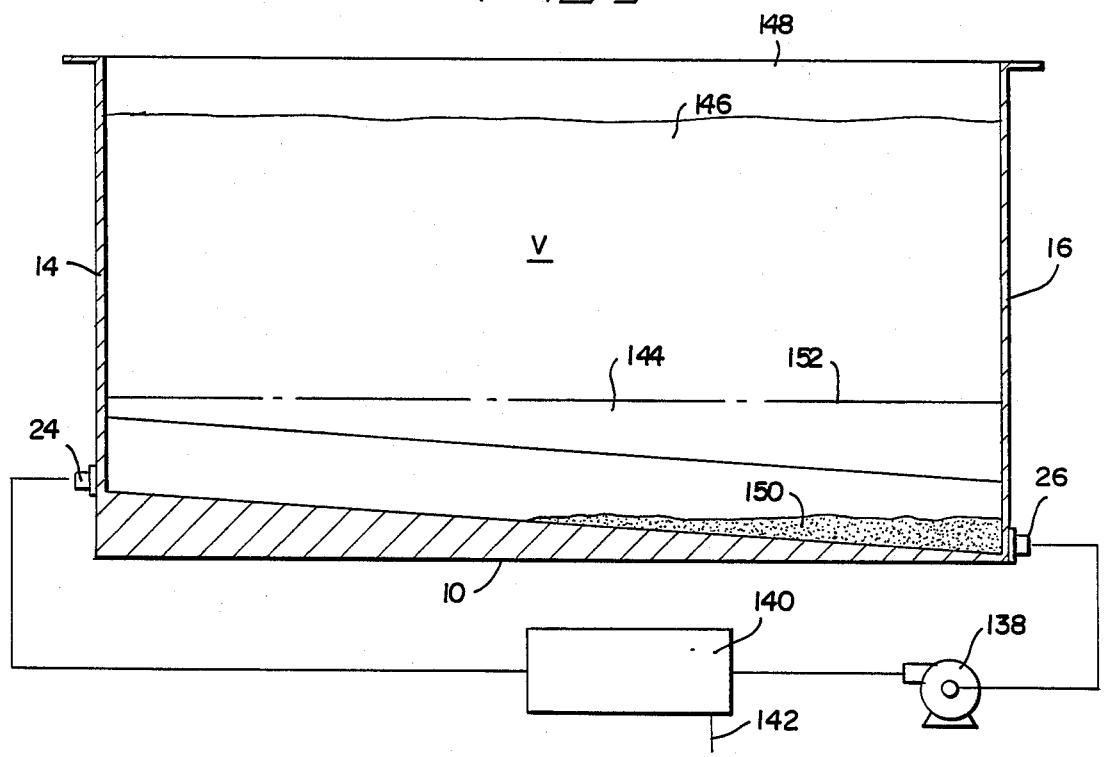
FIG. 3 is a longitudinal cross-sectional view similar to FIG. 1 and including a pumping system.

FIG. 3 discloses pump 138 which has the input thereof in fluid connection with pump connection 26. The outlet of pump 138 is in fluid connection with filter 140, which has the fluid outlet thereof in connection with pump connection 24. The filter 140 also has a particulate outlet 142. The pump 138 recirculates the water in conductive layer 144. Above conductive layer 144 is insulative layer 146, which perferably is comprised of an organic material, such as diesel fluid, a hydrocarbon distillate. Gas space 148 is above insulative layer 146 and communicates with gas outlet 32. FIG. 3 also discloses precipitate sediment 150 which is formed by the simultaneous plasma pyrolysis of the conductive layer 144 and the insulative layer 146. Also disclosed in FIG. 3 is the interface 152 which is formed by the juxtaposition of the immiscible layers 144 and 146.

FIG. 2 discloses droplets 154 issuing through perforations 102 of tube 100. The droplets 154 are comprised of the fluid material of conductive layer 144. Pumping of gas through gas jets 124 causes the surrounding fluid of conductive layer 144 to be drawn into the associated gas tube 112 or 114, and to be transported upwardly therewith along with the gas. The pumped gas generates a vacuum which an airlift effect for transporting the conductive material. The conductive fluid issues through the perforations 102 and, because of density differences, falls downwardly into the trays 94. In this way, the droplets 154 maintain a substantially constant volume of conductive fluid within the trays 94, so that the surrounding insulative layer 146 forms another interface region, this one with the fluid contained within the trays 94. Therefore, the conductive fluid 144 always has an essentially constant volume in the trays 94. The level of the conductive layer may be located below the trays 94, without having any adverse effect on operation of the device, providing that the inlets 116 and 118 are located below the first interface 152. Furthermore, the use of the gas lift system in conjunction with the trays 94 avoids the need for an accurate volume or level control, such as would be required without the trays 94.

The trays 94 also help to avoid the formation of a precipitated barrier layer which would hinder the generation of a stable plasma field. The constant flow of droplets 154 causes the fluid within the tray 94 to overflow over the edge 98. The edge 98 therefore acts as a weir. This constant flow causes any precipitated particulates which may accumulate within the trays 94 to be swept outwardly therefrom, and thereby avoid the build-up of deposits and the like in the tray 94.

We have disclosed the use of an insulative layer 146 and a conductive layer 144, with the insulative layer located above the conductive layer 144. Those skilled in the art will understand, however, that the orientation of the layers 144 and 146 could be reversed. It is merely required that there be an insulative layer in juxtaposition with a conductive layer for forming an interface so that discharge plasma generation will occur. Furthermore, because the process is non-specific, each of the layers 144 and 146 may itself contain a material which is to be destroyed, such as an agrichemical or the like.

Also, the terms conductive and insulative will be understood to be relative terms.

We have found that the best operation occurs when the conductive layer contains water, preferably hard water so as to increase the conductivity thereof. It is our belief that the oxygen in the water molecules participates in the chemistry occurring within the electric arc region. Furthermore, atomic oxygen from the water is also involved in the overall chemistry of the reaction. The water molecules themselves are probably not dissociated. Rather, a shift reaction most likely occurs between the water and the carbon formed during the hydrocarbon pyrolysis. Molecular hydrogen and carbon monoxide are also produced from the water carbon shift reaction, as well as from the breakdown of hydrocarbons during this pyrolysis.

We have also found that the process operates best when the insulative fluid 146 is a carbonaceous fluid, such as diesel fuel. Dilutents dissolved in the organic phase appear to have some effect on the composition of the generated gases. For example, we have observed higher fractions of unsaturates and saturates leading to higher heating value, and that the dilutents appear to cause the unsaturated fraction to become elevated, much as would occur with a catalyst.

The process of the invention relies upon the high temperatures produced in an electrical discharge which dissociates and reforms molecular species. This change occurs at a quiescent oil-water interface provided by an immiscible waste oil and a waste fluid. Both layers are treated simultaneously and the products of the reaction are a clean fuel gas, a highly condensed hydrocarbon structure, and a precipitate of inorganic salts. Gas cleaning or scrubbing is not required and the solid precipitates formed are not found to be hazardous.

the eletrcical discharges created between the electrodes 66 are very localized. They are produced at the tip of the electrodes 66, which are themselves positioned close to the oil-water interface between the conductive fluid in the trays 94 and the surrounding insulative layer 146. The electrical potential between the paired electrodes 66 builds to a level where the insulating oil 146 breaks down, causing an electrical discharge or arc to the more conductive water phase. The arcing achieves a pseudosteady-state as the liquids within the interface region become saturated with ionic species and small carbon-rich precipitates which, we believe, act as storage sites for electron avalanches during discharge. The electrical discharge zone is maintained as a small fraction of the overall system volume. Consequently, bulk temperatures and pressures do not build to an excessive level, thereby avoiding gross convection and boiling. Preferably, the electrodes 66 are positioned approximately 0.5 cm above the oil-water interface provided by the fluid in the trays 94 and the surrounding fluid 146.

Tables 1-3 illustrate the experimental results achieved when the pyrolysis reactor of the invention was run with varying liquid constituents.

TABLE I

| GASEOUS COMPONENT | TAP WATER | 600 PPM:F$^-$ | 300 PPM:F$^-$ | 150 PPM:F$^-$ |
|---|---|---|---|---|
| $C_5=+$ | 3.4 | 4.1 | 1.3 | 1.1 |
| $H_2$ | 64.3 | 64.8 | 59.5 | 60.4 |
| $C=C$ | 6.3 | 17.7 | 9.8 | 8.3 |
| $C_3=$ | 0.6 | 1.1 | 0.7 | 0.5 |
| $CO_2$ | 3.2 | 0.2 | 2.2 | 2.6 |
| $C_2=$ | 2.3 | 3.8 | 2.9 | 2.6 |

TABLE I-continued

| GASEOUS COMPONENT | TAP WATER | 600 PPM:F$^-$ | 300 PPM:F$^-$ | 150 PPM:F$^-$ |
|---|---|---|---|---|
| C$_2$ | 0.1 | 0.1 | 0.3 | 0.2 |
| C$_1$ | 2.5 | 3.4 | 3.0 | 3.0 |
| CO | 17.1 | 3.9 | 9.7 | 20.5 |
| Total | 99.8 | 99.1 | 99.4 | 99.2 |

Table 1 compares the gas which was evolved in a series of runs. The second column illustrates the gaseous components produced when the conductive layer was comprised of tap water. The succeeding three columns illustrate the gaseous components produced when fluoride ions, of the noted concentrations, were first mixed with the water phase. Note the tremendous increase in acetylene concentration which occurred as compared to that produced with plain tap water. We theorize that the fluoride ions act as a Lewis acid which catalyses the reaction which is occurring. We expect that a similar effect may be possible with Friedel-Crafts catalyst and that either may be used to produce high concentrations of unsaturated hydrocarbons for use with petrochemical feedstocks. Note also that the carbon monoxide concentration dropped dramatically when the fluoride ion concentration was 600 PPM. The unsaturated hydrocarbon content therefore increased at the expense of the carbon monoxide and carbon dioxide formation, thereby permitting us to increase the level of unsaturates up to about 35–45% of the level for pure hydrocarbon pyrolysis. Therefore, valuable olefinic gases can be produced, and also hazardous liquid organic wastes utilized, and disposed of.

Table 2 compares certain characteristics of the generated gas under the same conditions evaluated in Table 1.

TABLE 2

| CHARACTERISTIC | Tap Water | 600 PPM:F$^-$ | 300 PPM:F$^{-1}$ | 150 PPM:F$^-$ |
|---|---|---|---|---|
| PERCENT UNSATURATES | 12.6 | 26.7 | 14.7 | 12.5 |
| PERCENT H$_2$ + CO | 81.4 | 68.7 | 79.2 | 80.9 |
| PERCENT CO$_2$ | 3.2 | 0 2 | 2.2 | 2.6 |
| PERCENT SATURATES | 2.6 | 3.5 | 3.3 | 3.2 |
| Ratio H$_2$/CO | 3.76 | 16.6 | 3.0 | 2.9 |
| HEATING VALUE (BTU/SCF) | (605) | (813) | (518) | (558) |

Note that the ratio of hydrogen to carbon monoxide is dramatically increased when the fluoride ion concentration is at the 600 level. Likewise, note the substantial increase in the unsaturate concentration at the same acid level. The increased BTU value is also to be noted. The high hydrogen to carbon monoxide level results in a synthesis gas suitable for Fisher-Tropsch and methanol processing. Table 2 clearly indicates that the process results in the production of unsaturated hydrocarbons plus a high percentage of hydrogen and carbon monoxide, such as to provide a synthesis gas for aldehydes, ketones and other similar oxo chemicals.

Table 3 illustrates the resulting gas characteristics when certain materials were utilized in the insulative phase. The example illustrating diesel mixed with Di-Syston is based upon a 10% by-volume mix of Di-Syston with diesel. Those skilled in the art understand that Di-Syston is an insecticide having a sulfur and a phosphorous component, and is an example of a toxic chemical which has heretofore been difficult to dispose of with any degree of safety.

TABLE 3

| GAS CHARACTERISTIC | N-HEPTANE | DIESEL | TOLUENE | DIESEL DI-SYSTON |
|---|---|---|---|---|
| PERCENT UNSATURATES | 25.6 | 12.6 | 11.6 | 15.8 |
| PERCENT H$_2$ + CO | 69.4 | 81.5 | 88.9 | 76.8 |
| PERCENT CO$_2$ | 0.8 | 3.2 | 1.10 | 1.2 |
| PERCENT SATURATES | 4.4 | 2.6 | 3.1 | 4.7 |
| RATIO H$_2$/CO | 5.08 | 3.75 | 3.49 | 4.17 |
| HEATING VALUE (BTU/SCF) | (842) | (605) | (551) | (692) |

The results of Table 3 illustrate the unexpected influence of the Di-Syston on the unsaturated fraction. It was expected that the fast pyrolysis of small, straight-chain hydrocarbons would result in the production of maximum unsaturates, while aromatic hydrocarbons would give much lower fractions of unsaturates. The increased unsaturate level when Di-Syston was mixed with the diesel indicates a catalyzing effect causing the unsaturate concentration to increase relative to the straight diesel run. Also unexpected was the increased heating value and the elevated ratio of hydrogen to carbon monoxide.

A major factor in the chemistry which takes place is due to the fast thermal pyrolysis. Fast pyrolysis requires energy fluxes above 50 w/cm$^2$ and a thermal source in excess of 500° C. Fast pyrolysis favors the dissociation of large molecules to smaller molecules (gases) and an increase in the numbers of unsaturated bonds. The requirement that the gases by electrically conductive skews the composition to favor the more conductive species, such as acetylene and hydrogen, as compared to methane and ethane.

Once the chemistry is established and the gases formed, then they must be quenched or the composition will change over time. The bell housings 60 permit this quenching to occur and a relatively low operating temperature to be maintained. Carbon build-up is reduced because the water phase is present at the point of decomposition. We theorize that the oxygen from the water oxidizes the carbon formed and produces oxy-carbon compounds, such as carbon monoxide and carbon dioxide. Quenching also reduces turbulence and gross boiling effects which could detract from the efficiency with which the thermal energy supplied is converted to chemical energy.

The gases produced by the invention contain oxygenated carbon compounds and larger fractions of hydrogen. The water can act both as a sink and as a source for gaseous products. For example, caustic water can be used to form an insoluble carbonate participate to remove carbon dioxide. Furthermore, air injection can be used, such as by introduction through the gas lift system, if free molecular nitrogen is needed, as when ammonia is to be manufactured.

While this invention has been described has having a preferred design, it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention of the limits of the appended claims.

What we claim is:

1. A process for enhancing the production of unsaturated hydrocarbons, comprising the steps of:
   (a) juxtaposing two generally immiscible fluidic materials so that said materials form discrete layers and an interface region therebetween, one of said materials being an insulative organic material and the other of said materials being conductive and at least one of said layers comprising a catalyzing agent;
   (b) establishing a plasma field in said interface region and thereby thermally decomposing and chemically reforming a portion of each of said materials into a gas mixture comprising unsaturated hydrocarbons; and,
   (c) collecting said gas mixture.

2. The process of claim 1, including the step of:
   (a) supplying acid as said catalyzing agent a member selected from the group consisting of Lewis acids, and Fridel Crafts catalysts.

3. The process of claim 1, including the step of:
   (a) supplying a water-containing mixture as said other material.

4. The process of claim 3, including the steps of:
   (a) supplying a hydrocarbon mixture as said organic material, said water-containing mixture comprising at least 150 ppm of fluoride ions.

5. Fast pyrolysis reactor, comprising:
   (a) first means defining a bounded volume and including a fluid inlet and a gas outlet;
   (b) first and second laterally spaced and aligned electrodes positioned within said volume;
   (c) second means positioned within said volume and defining an interface region extending between said electrodes, the interface region being formed by two generally immiscible juxtaposed fluids; and,
   (d) power supply means having a positive pole and a negative pole, one of said poles operatively connected with said first electrode and the other of said poles operatively connected with said second electrode so that a plasma field is generated between said electrodes when the interface region is established therebetween and so that the fluids are thereby thermally decomposed and chemically reformed into a gas mixture.

6. The reactor of claim 5, wherein said second means includes:
   (a) a tray having a bottom and side walls extending from the periphery thereof, said tray having an open top forming a weir which defines the interface region.

7. The reactor of claim 5, further comprising:
   (a) third means operatively associated with said volume and cooperating with said second means for supplying at least one of the fluids to said second means for maintaining the interface region.

8. The reactor of claim 7, wherein said third means includes:
   (a) a first perforated tube disposed above said second means and a second tube extending therefrom generally transverse to said first tube and in flow communication therewith; and,
   (b) a gas supply tube positioned within said second tube and operatively connected with a supply of pressurized gas so that gas issuing from said supply tube will percolate upwardly through said second tube to said first tube and thereby cause a portion of one of the fluids to flow therewith and to be ejected through said first tube and to thereby flow downwardly therefrom to said second means.

9. The reactor of claim 8, wherein:
   (a) a gas pump being operatively connected with said gas outlet and with said gas supply tube for supplying pressurized gas to said gas supply tube.

10. The reactor of claim 6, wherein:
    (a) a first perforated tube being positioned within said volume and disposed above said open top;
    (b) at least a second tube being in flow communication with said first tube and having an inlet disposed below said bottom;
    (c) a gas supply tube being position within said second tube and having an outlet disposed above said second tube inlet; and,
    (d) a source of pressurized gas being operatively connected with said supply tube so that gas issuing from said supply tube outlet causes fluid surrounding said second tube inlet to be drawn therein and to be transported thereby and therewith to said first tube so that the transported fluid exits through the perforations and flows downwardly therefrom to said tray.

11. The reactor of claim 5, wherein:
    (a) a gas collection bell being positioned within said volume and above said electrodes for collecting the generated gas and for transmitting the collected gas to said gas outlet.

12. The reactor of claim 11, wherein:
    (a) a gas collection bell being associated with each of said electrodes;
    (b) a gas transport tube extending from each of said bells and having an outlet in flow communication with said gas outlet; and,
    (c) each of said electrodes depending from one of said bells.

13. The reactor of claim 12, wherein:
    (a) said bells being operatively interconnected and forming a bell network suspended from said first means;
    (b) said second means beng suspended from said first means; and,
    (c) means electrically insulating each of said bells and said second means.

14. Fast pyrolysis reactor, comprising:
    (a) a tank having a bottom, top and side walls extending therebetween and defining a reaction chamber, a fluid inlet and a gas outlet communicating with said chamber;
    (b) a plurality of cooperatively paired first and second electrodes, each electrode of a pair being laterally spaced from and vertically aligned with its paired associated electrode;
    (c) gas collection means operatively associated with each of said electrodes and communicating with said gas outlet for collecting generated gas and for permitting the generated gas to flow to said gas outlet;
    (d) power supply means having a positive terminal and a negative terminal, one electrode of each pair operatively connected with said positive terminal and the other electrode of each pair operatively connected with said negative terminal; and,
    (e) tray means extending between and spaced below the electrodes of each pair for defining an interface region extending between said electrodes so that a plasma field is generated between the electrodes of each pair when an interface is formed by two generally immiscible fluids which are thermally decomposed by the plasma field into a gas mixture.

15. The reactor of claim 14, further comprising:
(a) means for supplying one of the immiscible fluids to said tray means for maintaining an essentially constant volume of said one fluid and thereby maintaining the interface region at a selected elevation relative to said electrodes.

16. The reactor of claim 15, wherein said supply means includes:
(a) a first perforated tube extending above and in alignment with said tray means;
(b) at least a first second tube in flow communication with said first tube and having an inlet disposed below said tray means;
(c) a third tube positioned within said second tube and having a gas outlet disposed above said second tube inlet; and,
(d) a source of pressurized gas operatively associated with said third tube for supplying a gas thereto so that the gas exits said third tube outlet and thereby causes fluid surrounding said second tube inlet to be drawn therein and to be thereby transported to said first tube to be expelled through the perforations so that the transported fluid then flows downwardly to said tray means.

17. The reactor of claim 16, wherein:
(a) said source including a gas pump operatively connected with said gas outlet so that generated gas is thereby pressurized and transported to said third tube.

18. The reactor of claim 15, wherein said gas collection means includes:
(a) a pluralty of bells, each of said bells being disposed above at least one of said electrodes; and,
(b) a gas transport tube extending from each of said bells and having an outlet in flow communication with said gas outlet.

19. The reactor of claim 18, wherein:
(a) each of said electrodes depending from one of said bells and having a portion extending parallel to the associated gas transport tube.

20. The reactor of claim 18, wherein:
(a) there being a plurality of tray means, each tray means being disposed between the electrodes of a plurality of electrode pairs; and,
(b) each of said bells being associated with a plurality of electrodes.

21. The reactor of claim 20, wherein:
(a) a frame being suspended from said top;
(b) a plurality of first insulation means extending from said frame and supporting said bells; and,
(c) a plurality of second insulation means extending from said top and supporting said tray means.

22. The reactor of claim 21, wherein;
(a) said electrode pairs being disposed in spaced relation along said frame; and,
(b) said bottom sloping from a first one of said electrode pairs to a last one of said electrode pairs.

23. The reactor of claim 21, wherein:
(a) said first tube being centrally located relative to said frame and said tray means.

24. The reactor of claim 16, wherein:
(a) there being a plurality of tray means, each of said tray means being associated with a plurality of said electrode pairs; and,
(b) said second tube being disposed intermediate and adjacent two of said tray means.

25. The reactor of claim 21, wherein:
(a) means being operatively associated with said frame for adjustably positioning said frame relative to said top.

* * * * *